April 29, 1958 — E. R. DECOSSE — 2,832,637
EXTENSIBLE HOUSE TRAILER
Filed Nov. 1, 1956 — 2 Sheets-Sheet 1
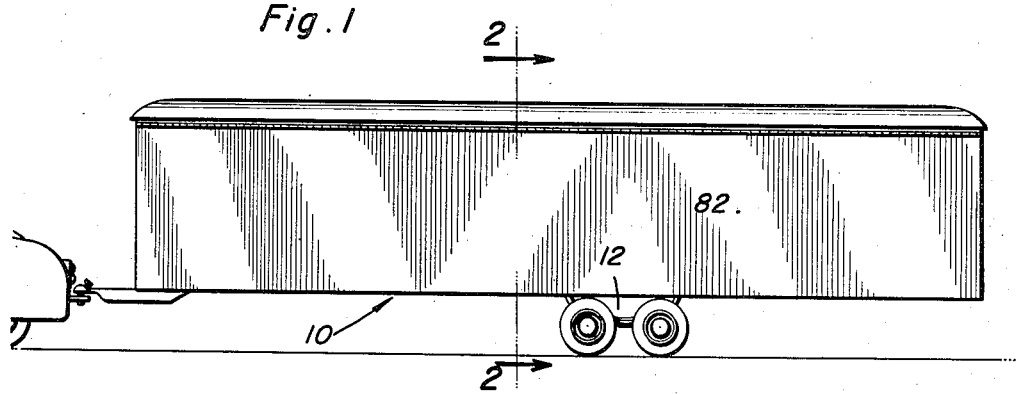
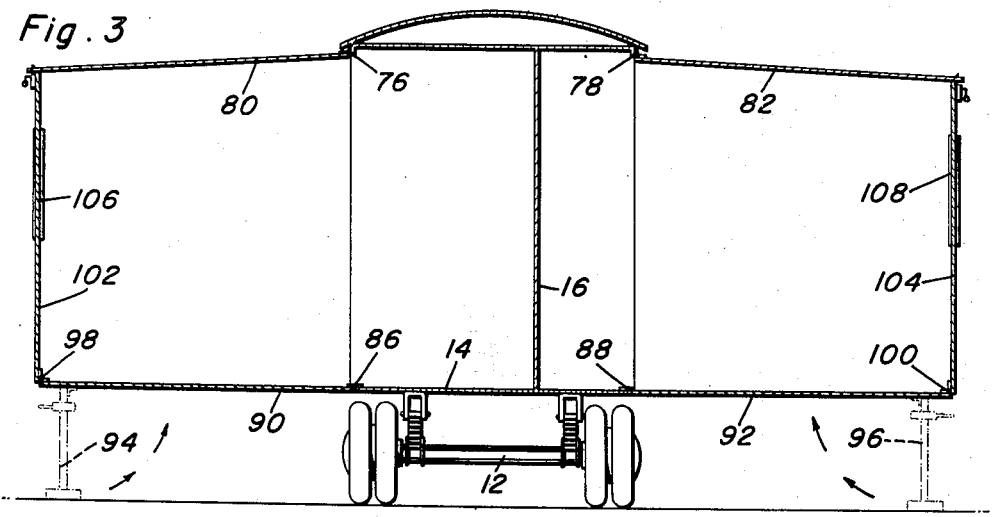
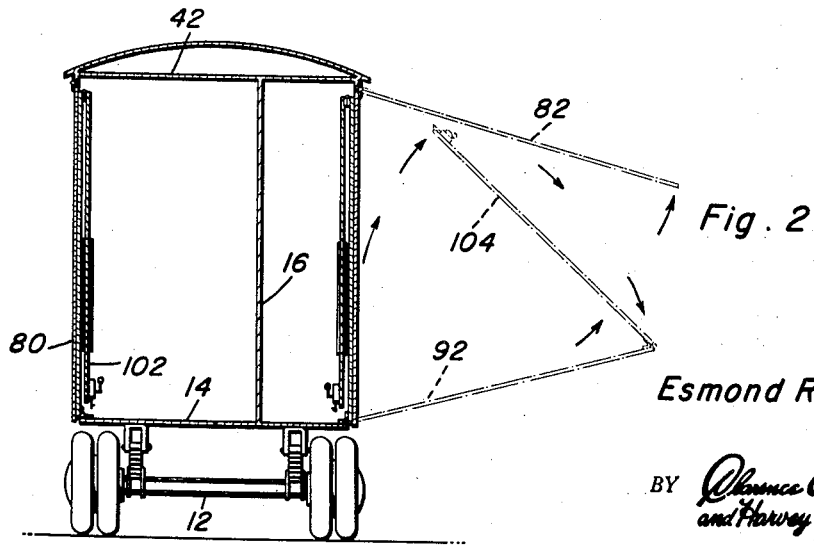
Esmond R. Decosse
INVENTOR.

April 29, 1958  E. R. DECOSSE  2,832,637
EXTENSIBLE HOUSE TRAILER
Filed Nov. 1, 1956  2 Sheets-Sheet 2

Esmond R. Decosse
INVENTOR.

BY *Clarence A. O'Brien*
*and Harvey B. Jacobson*
Attorneys

United States Patent Office 2,832,637
Patented Apr. 29, 1958

2,832,637

EXTENSIBLE HOUSE TRAILER

Esmond R. Decosse, Churubusco, N. Y.

Application November 1, 1956, Serial No. 619,758

3 Claims. (Cl. 296—26)

This invention relates to an extensible house trailer which is adapted to be towed behind an automobile or other tractor vehicle.

The primary object of the present invention resides in the provision of a trailer which is of a shape and size as to be convenient and permissible to be towed on highways behind an automobile or other vehicle yet which may be extended and expanded to a size so as to provide an increased over-all floor space allowing convenient and comfortable living.

A further object of the invention resides in the provision of a trailer which may be readily towed along a highway with the extensible portions compactly folded and with all furniture carried therein yet which may be extended to form a relatively large comfortable dwelling.

The construction of this invention features the provision of a trailer having a partition extending between floor and roof which is offset from the center of the trailer and supports the roof. There is provided roof, floor and wall panels hingedly mounted which are adapted to be folded flush with the sides of the trailer when not in an extended position yet which may be extended outwardly to form a relatively large dwelling. Additional partitions are provided which are engageable in grooves formed in the roof and floor panels so as to provide a compact, rigid, and relatively weatherproof construction.

Still further objects and features of this invention reside in the provision of an extensible housing that is simple in construction, relatively inexpensive to manufacture, and which is adapted to provide a surprisingly large amount of floor space for convenient and comfortable living.

These, together with the various ancillary objects and features of the invention which will become apparent as the following description proceeds, are attained by this house trailer, a preferred embodiment of which has been illustrated in the accompanying drawings, by way of example only, wherein:

Figure 1 is a side elevational view of a house trailer comprising the present invention shown in a folded position;

Figure 2 is a transverse sectional detail view as taken along the plane of line 2—2 of Figure 1 and showing on an enlarged scale the trailer in a folded position while showing in phantom lines the manner in which the various panels may be opened when extending the trailer;

Figure 3 is a sectional detail view similar to that shown in Figure 2 but showing the trailer in an extended position;

Figure 4:
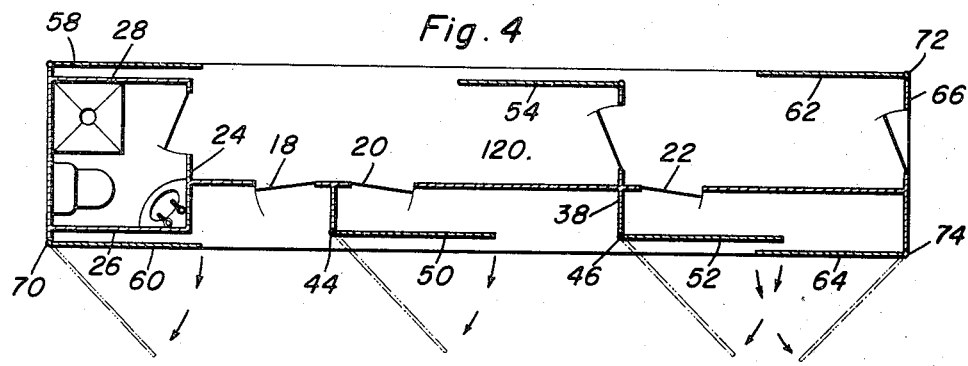
Figure 4 is a horizontal sectional view through the trailer illustrating a floor plan thereof when in a non-extended position with the roof, floor, and wall panels eliminated from the trailer.

With continuing reference to the accompanying drawings wherein like reference numerals designate similar parts throughout the various views, reference numeral 10 generally designates the extensible trailer comprising the present invention which includes a chassis 12 provided with a floor 14. The chassis 12 may be of any convenient construction complying with various highway regulations.

Rising upwardly from the floor 14 and extending longitudinally of the chassis 12 and offset from the center line thereof is a main partition 16. This main partition may be provided with openings for doors as at 18, 20, 22, etc. and may optionally extend the entire length of the trailer or may terminate at a transverse partition 24 which together with other longitudinal partitions 26 and 28 together with an end wall 30 form a compartment 32 providing toilet facilities. A door 34 may be provided for access to the compartment 32.

Figure 5:
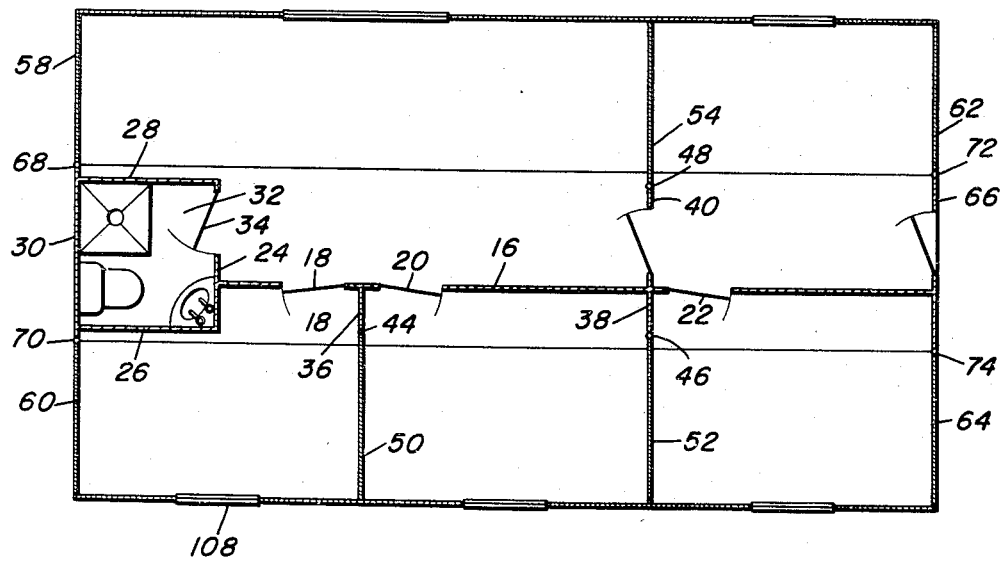
Figure 5 is a horizontal sectional view of the trailer when in an extended position.

Supported mainly by the partition 16 and by the partitions 24, 26, 28, as well as by transverse partitions 36, 38 and 40 is a roof structure 42 of any suitable configuration providing a ceiling and roofing for the trailer. Hingedly secured as by piano hinges as at 44, 46 and 48 are partition panels 50, 52 and 54. These partition panels 50, 52 and 54 are adapted to be folded from a longitudinally extending position as is shown in Figure 4 to a transversely extending position as is shown in Figure 5.

End panels 58, 60, 62 and 64 are hingedly secured to the end walls 30 and 66 of the trailer by piano hinges as at 68, 70, 72 and 74.

Figure 6:
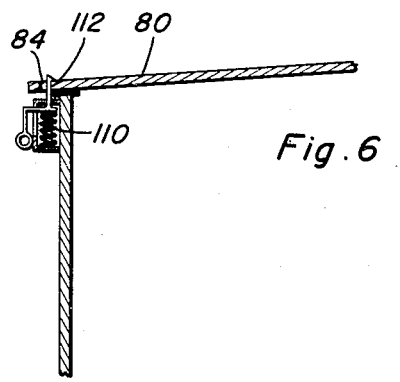
Figure 6 is a sectional detail view illustrating the latch means utilized in connecting a wall panel to a roof panel.

Hingedly secured to the roof structure by means of piano hinges 76 and 78 which may be of the piano type or variety are roof panels 80 and 82. The roof panels as can be best seen in Figure 6 are each apertured as at 84.

Hingedly secured to the floor 14 by means of hinges 86 and 88 are floor panels 90 and 92 which are adapted to be supported by jacks or other suitable supports as at 94 and 96 when in an extended position. Hingedly secured to the floor panels 90 and 92 as by piano hinges 98 and 100 are side wall panels 102 and 104 which may be provided with window or other access openings as at 106 and 108 and each of which carry a spring pressed latch arrangement 110 having a latch member 112 of generally hook shape adapted to extend through the roof apertures 84 to engage the roof panels. This is seen best in Figure 6.

With the latches 110 in an engaged position, the trailer is arranged in an extended position as is shown in Figures 3 and 5. The floor panels 90 and 92 as well as the roof panels 80 and 82 are grooved for reception of the partition panels 50, 52, and 54, if desired, so that a rigid and secure connection between the partition panels and the other structural elements can be achieved. Otherwise, suitable latching arrangements can be utilized.

When it is desired to move the trailer from one location to another, the various structural elements may be folded from the position shown in Figure 3 to the position as shown in Figure 2, with the wall panels being folded down onto the floor panels and the floor panels then rotated upwardly and with the roof panels then overlying outwardly the wall and floor panels. Further, all furniture can be disposed of in the space as indicated at 120 in Figure 4 allowing the otherwise relatively large dwelling to be made more compact so as to enable it to be removed from location to another along highways without violations to restrictions as to width of vehicles moving on the highway.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An extensible house trailer comprising a wheeled chassis having a floor, a main partition extending longitudinally of said chassis and supported on said floor, a roof structure supported by said partition above said floor, roof panels hingedly secured to said roof structure, floor panels hingedly secured to said floor, wall panels hingedly secured to said floor panels, latch means associated with said wall panels and roof panels for securing said roof panels on said wall panels, and support means engaging said floor panels holding said floor panels level with said floor, transverse partitions secured to said main partition, and partition panels hingedly secured to said transverse partitions and extending between said roof panels and said floor panels, said main partition being offset transversely from the longitudinal center of said chassis.

2. An extensible house trailer comprising a wheeled chassis having a floor, a main partition extending longitudinally of said chassis and supported on said floor, a roof structure supported by said partition above said floor, roof panels hingedly secured to said roof structure, floor panels hingedly secured to said floor, wall panels hingedly secured to said floor panels, latch means associated with said wall panels and roof panels for securing said roof panels on said wall panels, and support means engaging said floor panels holding said floor panels level with said floor, transverse partitions secured to said main partition, and partition panels hingedly secured to said transverse partitions and extending between said roof panels and said floor panels, said roof panels and said floor panels having grooves therein, said partition panels being received in said grooves.

3. An extensible house trailer comprising a wheeled chassis having a floor, a main partition extending longitudinally of said chassis and supported on said floor, a roof structure supported by said partition above said floor, roof panels hingedly secured to said roof structure, floor panels hingedly secured to said floor, wall panels hingedly secured to said floor panels, latch means associated with said wall panels and roof panels for securing said roof panels on said wall panels, and support means engaging said floor panels holding said floor panels level with said floor, transverse partitions secured to said main partition, and partition panels hingedly secured to said transverse partitions and extending between said roof panels and said floor panels, said transverse partitions further supporting said roof structure, said roof panels and said floor panels having grooves therein, said partition panels being received in said grooves, said main partition being offset transversely from the longitudinal center of said chassis.

References Cited in the file of this patent

UNITED STATES PATENTS

| 1,431,783 | Diefenderfer | Oct. 10, 1922 |
| 2,155,582 | Bond | Apr. 25, 1939 |
| 2,368,936 | McGehee | Feb. 6, 1945 |
| 2,704,223 | Houdart | Mar. 15, 1955 |

FOREIGN PATENTS

| 710,424 | Germany | Sept. 12, 1941 |